June 28, 1932.  R. T. OSMAN  1,865,133
TRACTION VEHICLE
Filed May 28, 1930   3 Sheets-Sheet 3

Patented June 28, 1932

1,865,133

UNITED STATES PATENT OFFICE

RALPH T. OSMAN, OF MILWAUKEE, WISCONSIN, ASSIGNOR TO KOEHRING COMPANY, OF MILWAUKEE, WISCONSIN, A CORPORATION

TRACTION VEHICLE

Application filed May 28, 1930. Serial No. 456,417.

This invention involves certain improvements in what are known as endless traction or crawler type vehicles, and is particularly related to that type of such vehicles wherein a dumping body is mounted upon a suitable traction frame equipped with the customary endless belt type of traction devices.

The improvements hereof appertain primarily to the employment of a special arrangement of engine or motor devices mounted upon the frame supported by the traction devices, one engine being provided for each traction device and novel provisions being made for the driving of the traction devices from the engine by means of a special type of driving unit including the necessary driving shafts, drive gearing, driving tumblers and associated parts which will be more fully set forth hereinafter.

A special feature of the invention resides in the utilization of peculiar bracing means intermediate the driving unit carried by the body frame of the vehicle, and the frames of the traction units or devices.

In carrying out the improvements of this invention, there is utilized what may be characterized as a special housing mounted upon a side of the body frame of the vehicle and affording a semi-floating mounting for the adjacent or associated traction unit or device located at such side of the frame, the driving shaft for such traction unit having a mounting in the said housing and also a mounting in the outer side of the traction unit frame so as to afford a rigid construction of special advantage under practical conditions of service. The peculiar construction of the driving unit forming a part of this invention permits of pre-oscillation of the traction units or devices in parallel vertical planes, and the bracing means is designed with a special view to allowing such of the traction devices when the vehicle is being used and furthermore braces the traction devices themselves against weaving or lateral movement or play to any unauthorized extent. Resilient means is employed intermediate the forward end of the body frame and the traction units adjacent to the front ends of the latter, whereby to allow for independent, and to a certain extent, free floating movement of the traction devices relatively to one another, all as will appear more fully as this description proceeds.

In the accompanying drawings, in which similar reference characters designate like parts throughout the various views, the figures may be described as follows:—

Figure 3:
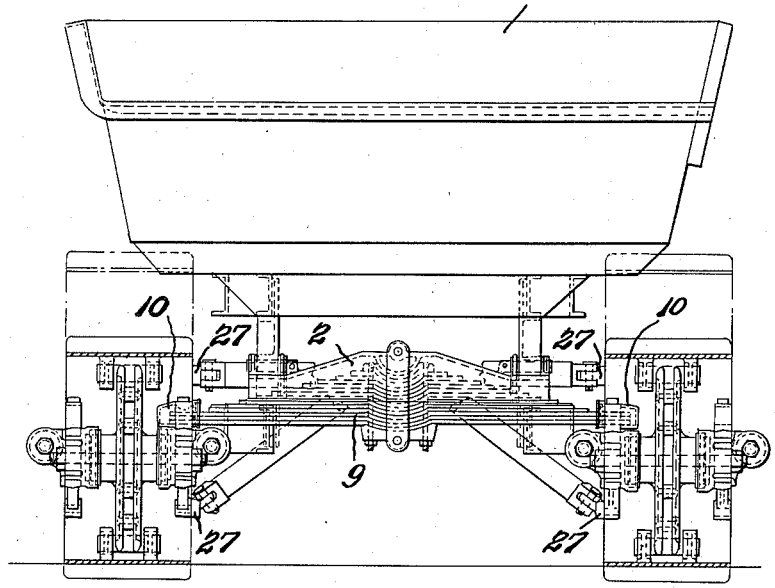
Figure 3 is a front end view of the vehicle bringing out more clearly the resilient mounting means intermediate the front ends of the traction units and the body frame, the traction belts being shown in section so as to develop the formation of the forward idler tumblers.

Setting forth the general construction of the vehicle with which the present improvements are used, and referring primarily to Figures 1 and 3, it is noted that my vehicle comprises a dumping body A which is not fully illustrated because not material to the features of invention hereinafter claimed. This vehicle body A is supported so as to have tilting movement upon a body frame 1 comprising sides, a front-combined frame member and spring housing 2 and a rear cross bar or frame member 3. At opposite sides of the body frame 1 are located the traction units which are of the endless crawler or belt type and embody each spaced frame members 4 that carry suitable belt guiding rollers 5. Each frame structure of the traction units is equipped at its rear end with a driving tumbler 6 which is not located at the rear extremity but adjacent thereto, the rear extreme portion of the frame 4—4 of each traction device having a guiding roller 7 for the traction belt and a similar roller 8 being located at the front extremity of such frame.

To establish a substantially floating mounting intermediate the front end frame member 2 of the body frame and the traction units, spring means 9 of the leaf type are utilized, being received in the housing constituted by the member 2, the opposite ends of certain of the spring leaves of said means 9 engaging in spring sockets 10 on the opposite front end portion of the inner frame members 4 of the traction device frame. As the spring means aforesaid do not form a part of the invention set forth in this application, but are embodied in a copending application Serial Number 457,214, filed May 29, 1930, they will not be described in detail, except to say that they afford the resilient connection desired between the front end of the body frame 1 and the traction units adjacent to the front ends of the latter.

Figure 1:
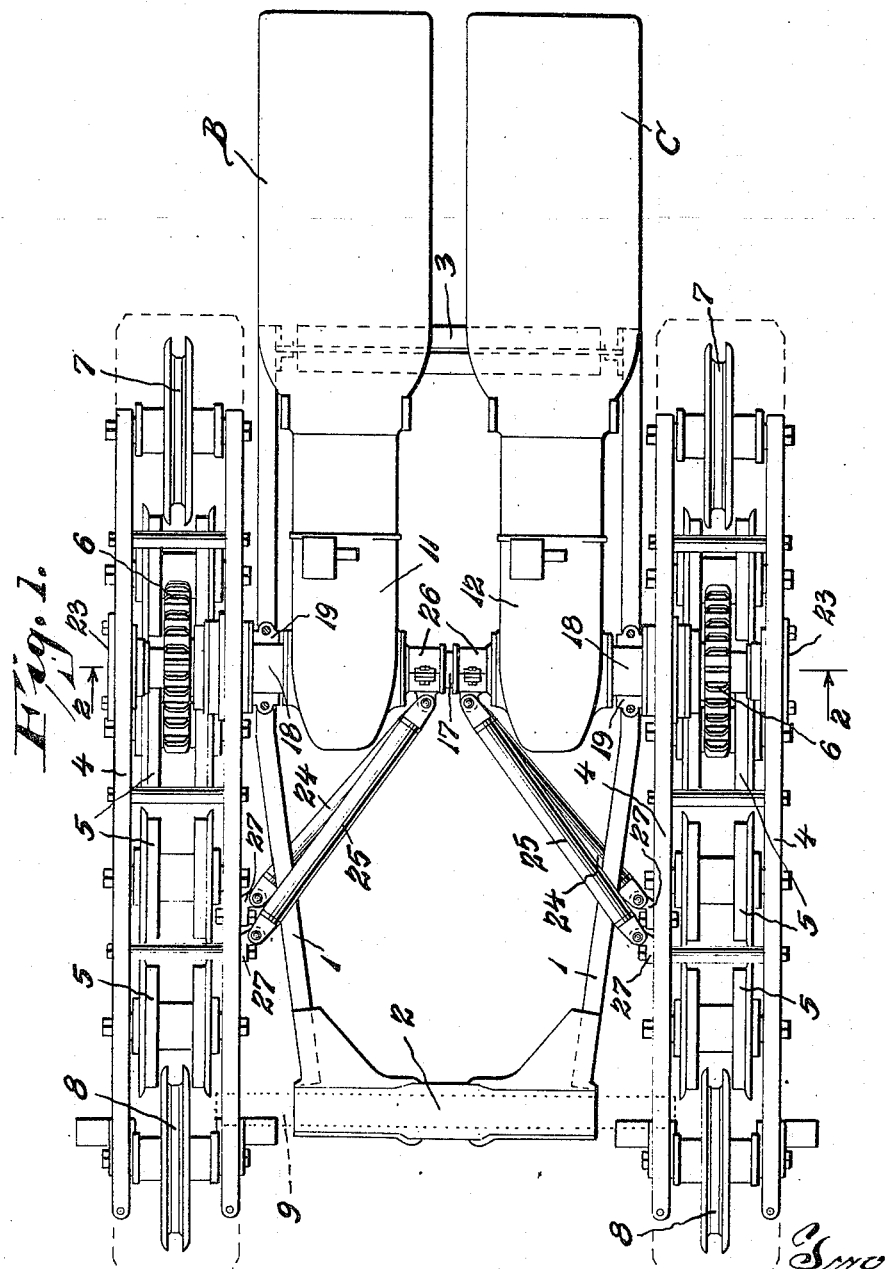
Figure 1 is a top plan view of a traction vehicle structure made in accordance with the invention, the dump body removed, and the traction belts illustrated in dotted lines, the same being of any conventional type.
Figure 2:
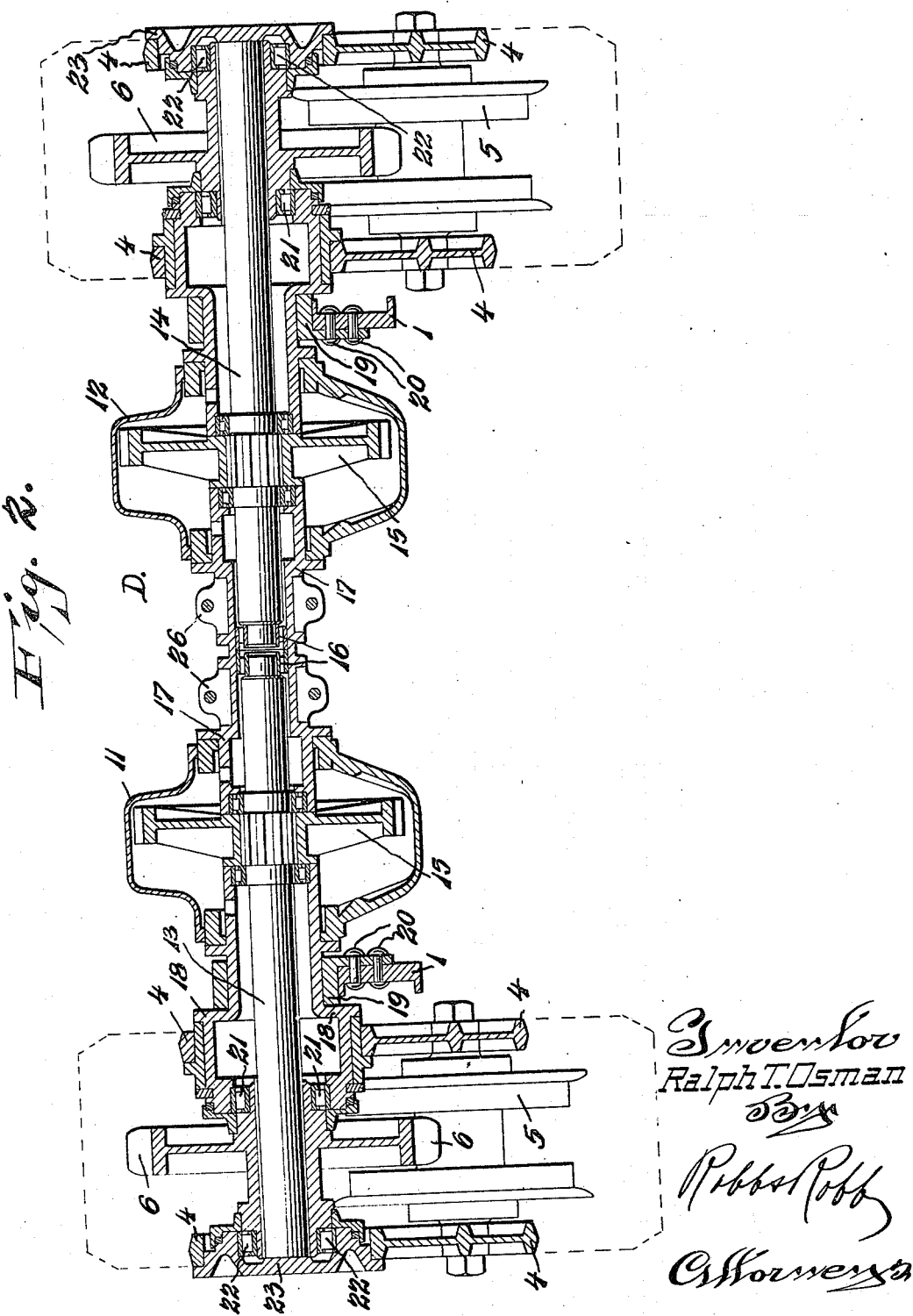
Figure 2 is a cross sectional view taken about on the line 2—2 of Figure 1, the traction belt being again illustrated by dotted lines.

As shown in Figure 1, there are mounted upon the body frame, two engines which will be generally designated as B and C, said engines comprising forwardly extending gear casings 11 and 12, containing the necessary driving gears and shafts, and clutch devices, whereby motion may be transmitted from the engine crank shafts, not shown, to the transverse driving unit generally designated in Figure 2 as D.

Referring now to Figure 2, the driving unit D is shown as comprising aligned drive shafts 13 and 14. The shafts 13 and 14 are mounted, geared and operate in identically the same manner so the arrangement and associated parts cooperating with each shaft will be described in relation to their co-action with an associated traction device, by reference to a single shaft structure primarily. Thus it will be seen that the shaft 13 carries a driven gear 15 operated from the engine B in the manner above mentioned, said shaft 13 being supported by suitable bearings at its inner end, which bearings 16 are carried within a central housing 17 by which the shafts are maintained in proper alignment at their inner ends and throughout their lengths, the housing 17 forming a sort of rigid joining means intermediate the two shafts 13 and 14. The housing 17 extends into the gear casings 11 and 12 at the opposite ends of the housing, the latter terminating at each end, adjacent to the gears 15. The housing therefore forms a mounting means supporting the front ends of the gear casings 11 and 12, and holds these gear casings firmly in place in conjunction with other parts now to be described.

Each traction unit frame side member 4 at the inside of the traction unit has a substantially sized bearing or opening receiving the outer end of a secondary housing 18 through which the shaft 13, or 14 as the case may be, passes, and at the outer end of which housing 18 is disposed the driving tumbler 6 which is of a sprocket like type so as to engage with pins or projections, not shown, on the shoes of the traction belt whereby to establish the necessary driving relation between the driving shafts 13 and 14 and the traction devices. The housing 18 is carried by the sides of the main frame 1, suitable bearing members 19 being availed of to attach the housings to the frame sides 1, as shown in Figure 2, and being riveted or otherwise fastened to the parts 1, as shown at 20. It may be noted that the housing members 17 and 18 are of hollow form with spaces intermediate their walls and the shafts 13 and 14 so that oil may be contained therein, under which conditions they form, practically speaking, oil casings or lubricant supply means for the bearings of the shafts 13 and 14 throughout the mounting portions of said shaft. Bearings 21 are interposed between the outer ends of the housing 18 and the hub portions of the adjacent driving tumblers 6 at the innermost parts of said hub portions. The outer ends or parts of the hub portions of the tumblers 6 are mounted on the outermost sides of the frame 4—4 of the traction units with suitable interposed bearings 22, as shown, cap plates 23 closing the bearings in the outer sides of the traction frames and substantially engaging the outer ends of the shafts 13 and 14, and having bearing races to receive the bearings 22 aforesaid.

By the foregoing arrangement of driving shafts, gears, and supporting housings, the driving unit of the invention is drivingly connected with the driving tumblers 6 for the traction devices, said tumblers 6 being keyed or otherwise secured to the shafts 13 and 14, to turn therewith, when the shafts are driven from the engines B and C. Moreover, from the foregoing, it will be observed that the major portion of the load carried by the vehicle is supported by the secondary housings 18, in regard to the distribution of the load in relation to the traction frame, the central housing 17 affording principally, a connector between the secondary housings 18 by acting as such through the intermediary provisions of the gear casings 11 and 12 and the shafts 13 and 14 themselves.

For bracing the traction units in their relation to the body frame structure of the vehicle, I provide tying means between the forward end portions of the traction units and the central portion of the driving unit D at the central housing member 17. With this in view there are employed a pair of upper links or brace bars 25, and a pair of lower brace bars 24. These brace bars are best seen in Figures 1 and 3. Their rear ends are pinned or otherwise connected to sectional collars 26 surrounding the central housing 17. The front ends of the bars 24 and 25 are firmly connected to arm plates 27 attached in any substantial manner by fastenings to the inner sides of the inner frame members 4 of the frames of the traction devices. From the above structure, as described, it will be evident that the traction units are braced by the bars 24 and 25 against transverse separating movement, are held properly with their spring sockets 10 in cooperation with the spring means 9, and the general structure of the whole assemblage set forth is reinforced in a substantial manner by said bars, so that the vehicle will stand up properly under the stresses and strains of the wear and tear incident to the use of vehicles of this class upon which heavy loads are dropped in filling the dumping body and tremendous strains caused by the driving action of the traction means pushing the dumping body against the dirt dumped, an operation known as "bull-dozing".

Having thus described my invention, what I claim as new and desire to secure by Letters Patent of the United States, is:—

1. In a traction vehicle, in combination, a body frame, traction belt frames at opposite sides of the body frame, an engine unit mounted on the body frame, together with a driving unit carried by the body frame and traction belt frames and operable by said engine unit, the driving unit comprising interconnected transverse driving shafts located intermediate the front and rear ends of the body frame, gearing on said shaft operable by the engine unit, a housing centrally between the sides of the body frame receiving said driving shaft, a secondary housing mounted in the body frame and receiving said driving shaft, a traction belt driving tumbler mounted on the outer end of said driving shaft, the engine unit comprising a gear casing enclosing the gearing aforesaid and forming a connector between the first mentioned housing and the associated secondary housing, and means interconnecting the driving unit and the traction belt frames to rigidly support the driving unit from the frames while preventing separating movement of the frames during service of the vehicle.

2. In a tractor vehicle of the class described, in combination, a body frame comprising spaced sides, a front transverse frame member and a rear transverse frame member, a driving unit mounted on the body frame intermediate its front and rear frame members, an engine unit connected with the driving unit, endless traction belt frames disposed at opposite sides of the body frame, means connecting the driving unit with the traction belt frames, and bracing means for the driving unit connected to the central portion thereof, the bracing means comprising upper and lower pairs of bars, the driving unit comprising a central housing between the sides of the body frame with connections between the rear ends of the bracing bars and the central housing, and other connections between the front ends of the bracing bars and upper and lower portions of the traction belt frames, whereby transverse separating movement of the traction belt frames at their forward ends is resisted.

3. In a traction vehicle of the class described, in combination, a body frame comprising spaced sides, a front transverse frame member and a rear transverse frame member, a driving unit mounted on the body frame intermediate its front and rear frame members, an engine unit connected with the driving unit, endless traction belt frames disposed at opposite sides of the body frame, means connecting the driving unit with the traction belt frames, and bracing means for the driving unit connected to the central portion thereof, the bracing means comprising upper and lower pairs of bars, the driving unit comprising a central housing between the sides of the body frame, with connections between the rear ends of the bracing bars and the central housing, and other connections between the front ends of the bracing bars and upper and lower portions of the traction belt frames, whereby transverse separating movement of the traction belt frames at their forward ends is resisted, spring sockets carried by the front ends of the traction belt frames, and spring means on the front end portion of the body frame maintained in proper engaging relation with the socket of the traction belt frames, by the action of the brace bars, the said springs permitting independent and free floating movement of the traction belt frames relatively to one another.

4. In a traction vehicle, in combination, a body frame, traction belt frames at opposite sides of the body frame, an engine unit mounted on the body frame, together with a driving unit carried by the body frame and traction belt frames and operable by said engine unit, the driving unit comprising interconnected transverse driving shafts located intermediate the front and rear ends of the body frame, gears carried by the driving shafts and contained in gear casings of the engine unit, a housing centrally between the sides of the body frame receiving said driving shafts, a secondary housing mounted in the body frame and receiving the said driving shaft, the central and secondary housing having oil containing chambers for the lubrication of the driving unit parts, driving tumblers carried by the driving shafts on the outer sides of the body frame, endless traction belt frames mounted at opposite sides of the body frame and of which said driving tumblers comprise portions having bearings in the outer ends of the secondary housing and closing the said ends of the said housings as described, combined with bracing means comprising bracing bars connected at their rear ends with the central housing of the driving unit.

5. A traction vehicle as claimed in claim 4, wherein the brace bars extend forwardly from the driving unit at the central portion of the latter and project outwardly to points adjacent the forward portion of the traction belt frames to support the driving unit upon the traction belt frames, swivel connections intermediate the rear ends of said brace bars and said central housing, connections pinning the forward ends of the brace bars to the endless traction belt frames, said brace bars comprising an upper pair connected with the traction belt frames above the body frame, and a lower pair connected with the traction belt frames by extending below the body frame, together with mounting means between the front end of the body frame and said forward end portions of the endless belt frames, the brace bars resisting transverse separating movement of the traction belt frames at their forward ends.

In testimony whereof I affix my signature.

RALPH T. OSMAN.